Nov. 18, 1941.  J. A. LIGNIAN ET AL  2,263,178
FLUID SEAL ASSEMBLY
Filed Oct. 14, 1937
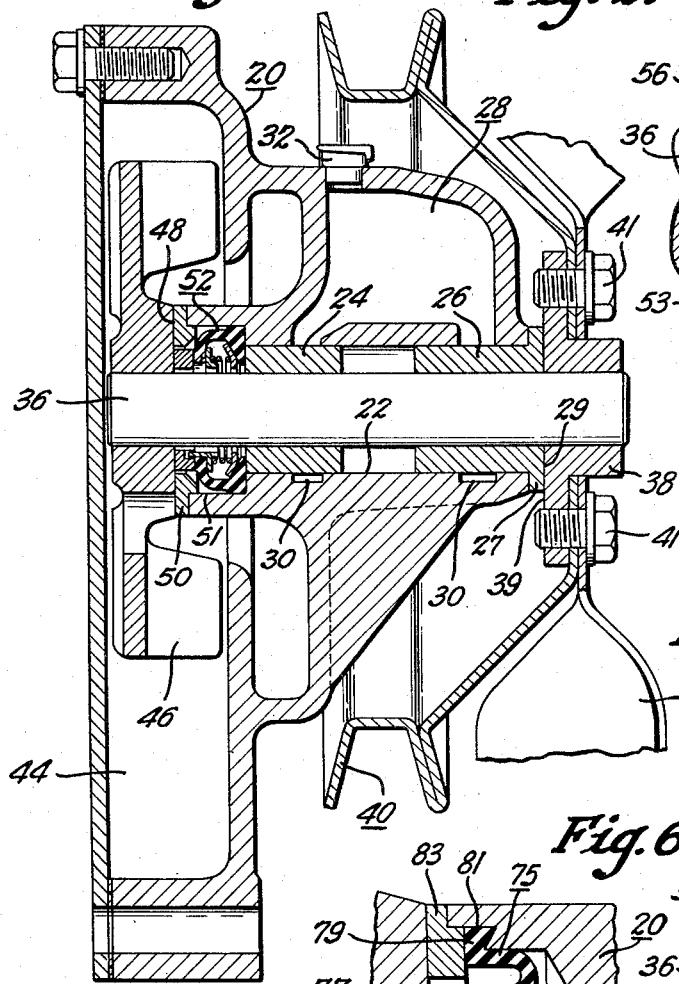
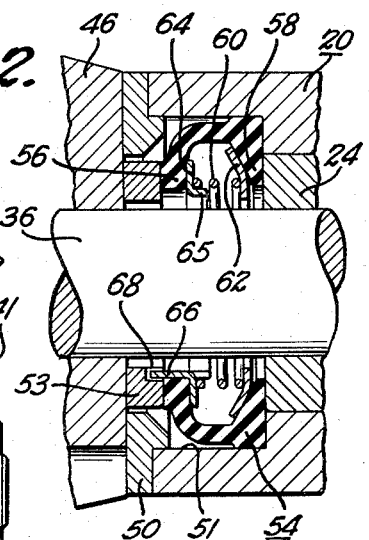
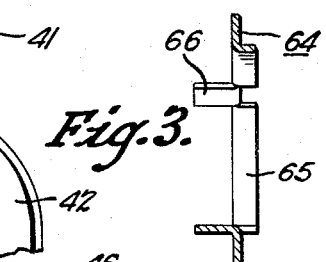
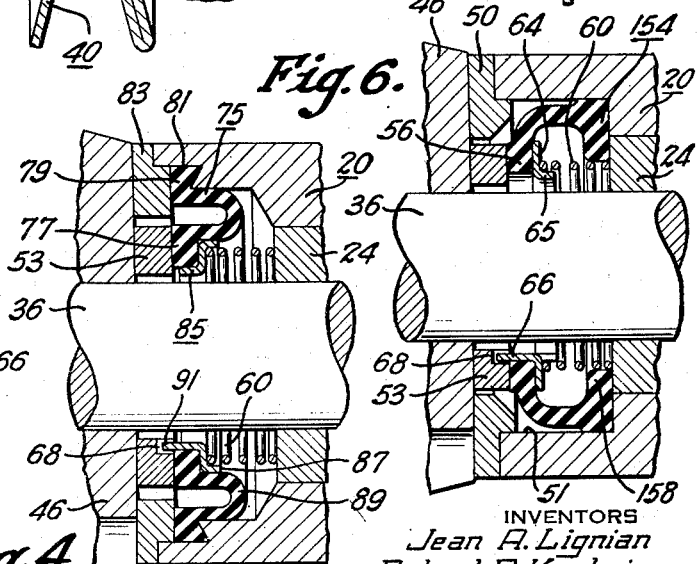
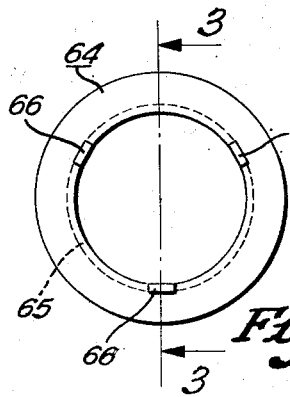
INVENTORS
Jean A. Lignian
Roland P. Koehring Patented Nov. 18, 1941

2,263,178

UNITED STATES PATENT OFFICE 2,263,178

FLUID SEAL ASSEMBLY

Jean A. Lignian and Roland P. Koehring, Dayton, Ohio, assignors to General Motors Corporation, Detroit, Mich., a corporation of Delaware Application October 14, 1937, Serial No. 168,910

4 Claims. (Cl. 286—11)

The present invention relates to fluid seals and more particularly to fluid seals used in connection with water pumps and the like.

In the past, much difficulty has been experienced in providing an efficient fluid seal between relatively rotatable elements wherein the journal for the rotating element has become worn and therefore allows the rotating element to wobble or become slightly eccentric in its movement. Seals that have operated with marked success on new assemblies have allowed considerable leakage after bearing wear has caused eccentricity of movement of the rotating element. In general, this defect in seals may be traced to the seal ring used. Usually this ring is made of metal or of such size as to have a high effective moment of inertia. Thus when eccentricity of movement occurs; even though minute, the movement of the seal ring lags such eccentric movement of the rotating element to permit leakage through the seal. Also the usual type of commercial seal assembly rotates with the rotating element which amplifies the aforementioned conditions since the relatively heavy seal ring acting under centrifugal conditions is not readily changed from its rotating path to adapt itself to eccentric motion.

The present invention contemplates a lightweight non-metallic seal ring of reduced size having a low effective moment of inertia and one which due to its inherent structure readily accommodates itself to eccentricity of movement and thereby maintains the seal unbroken during such movement. Such a ring, due to a dispersion of metallic particles therein, has a low coefficient of friction and long wearing qualities. Furthermore, in the present invention the sealing assembly is preferably stationary which further minimizes the effect of inertia and centrifugal action upon the efficiency of the seal.

With these objectives in view it is an object of the present invention to provide a fluid seal assembly that includes two sealing surfaces, one of which is characterized by a high coefficient of friction and the other sealing surface being characterized by a low coefficient of friction. Such a sealing assembly can be readily adapted for use on a conventional type of pump, for example, and will effectively seal the parts thereof from one another. The sealing surface of low friction coefficient acts as a sliding seal against the rotating parts of the pump whereas the sealing surface of high coefficient of friction seals against the stationary parts of the pump and thus prevents the rotation of the seal assembly, thereby reducing the wear and tear on the same.

Another object of the invention is to provide a seal assembly for sealing a shaft from its housing, which includes a resilient sealing member of high friction characteristics and a seal ring of low friction characteristics, the parts being disposed so that the sealing member bears and seals against the housing while the seal ring bears and seals against a portion of the shaft and also seals against the member, resilient means being provided to bear against the member to increase the pressure at the sealing surfaces. In carrying out the above object it is a further object to provide a non-metallic seal ring of relatively light weight and correspondingly low inertia and of low friction characteristics, such a ring preferably being formed of a molded plastic material having finely divided metallic particles dispersed therein. It is a further object, in some instances, to provide means for loosely keying the seal ring to the resilient sealing member.

It is a still further object to provide means associated with the housing for aligning the seal ring and sealing assembly and for maintaining such alignment during rotation of the shaft.

Further objects and advantages of the present invention will be apparent from the following description; reference being had to the accompanying drawing, wherein preferred forms of embodiment are clearly shown.

In the drawing:

Fig. 1 is a fragmentary view, in section, of a water pump including the improved seal construction.

Fig. 2 is a fragmentary view, on an enlarged scale, of the seal construction.

Fig. 3 is a section taken on the line 3—3 of Fig. 4.

Fig. 4 is a view of a spring retainer used in the seal construction.

Fig. 5 is a fragmentary view, on an enlarged scale, of a modified seal construction.

Fig. 6 is a fragmentary view on an enlarged scale of a second modification of the seal construction.

Referring to Fig. 1, an improved seal construction is shown in one of its many applications as incorporated in a water pump of an internal combustion engine. 20 indicates a chambered pump housing which encloses and supports the pump mechanism. The housing 20 includes a bore 22 that is preferably machined to receive two bushings 24 and 26 which are press-fitted into position within the bore 22. Bushing 26 has an outwardly extending flange 27 at one end thereof which flange abuts the pump housing 20 and thereby positions the bushing when the same is pressed into position within the housing. An outer surface 29, of flange 27, is utilized as a thrust bearing as will be described hereinafter. The bushings 24 and 26 are preferably fabricated of porous bronze. Such bushings may be purchased on the market under the trade name "Durex" which articles are formed from metal powders sintered together to form a substantially homogeneous bronze sponge having intercommunicating pores therein. Bushings of this type, due to their porous nature, are self-lubricating when oil is supplied externally of the bushings. An oil reservoir 28, which is formed by the walls of the housing 20 partially surrounds the bushings 24 and 26. Two undercut portions or channels 30 are provided in the wall of the housing 20 and communicate at either end thereof with reservoir 28. Thus the reservoir 28 and the communicating undercut portions 30 substantially surround the bushings and when the reservoir 28 is charged with a lubricant, such as oil, the bushings are substantially immersed in the lubricant. An oil cup 32 is provided in the top wall of housing 20 through which oil may be introduced into the reservoir 28. As previously explained the bushings 24 and 26, due to their porous nature have an ability to absorb the oil and due to capillary action within the intercommunicating pores thereof cause the oil to flow through the bushings to substantially maintain a lubricating film at the inner surfaces of the bushings.

A shaft 36 is journaled within the bushings 24 and 26 and carries a hub 38 at its outer end. The hub 38 is suitably secured to the shaft 36 to prevent relative movement between the shaft and hub. The inner surface 39, of the hub 38, is machined and, when the shaft is in position, the machined surface 39 bears against the flanged surface 29 of the bushing 26, thus preventing further inward movement of the shaft 36. A pulley 40 and fan 42 (shown in part) are secured to the hub 38 by a plurality of bolts 41 which are screw-threaded into hub 38. Pulley 40 may be connected by a belt (not shown) to any suitable driving means.

The opposite, or inner end, of the shaft 36 terminates within a water chamber 44 formed by walls of the housing 20 and has an impeller 46 suitably secured thereto so as to form a hermetic joint therebetween. The impeller 46 is preferably fabricated from a close-grained non-porous cast iron and is machined and polished at the inner surface 48 of its hub. The surface 48 is disposed to bear, and rotate against a flanged thrust bearing 50 which is pressed into a machined receiving bore 51 within the housing 20. The bearing 50 is preferably of the "Durex" type hereinbefore described. The bearing 50 and the flange surface 29 of bushing 26, act as two thrust bearings disposed at opposite ends of the shaft 36, thus preventing excessive end-play of the shaft when the aforementioned elements are assembled thereto. If desired the impeller can be fabricated from any other suitable material, such as brass or bronze, but it is important that the grain structure thereof is fine and the surface which bears against the bearing 50 is well machined, since this surface not only acts as a bearing against end-play of the shaft but also as a seal to be hereinafter described.

In order to prevent water from chamber 44 from seeping outwardly along the shaft 36 and also to prevent lubricant from reservoir 28 from seeping inwardly along the shaft 36, a sealing assembly 52 is provided. An enlarged view of a preferred form of sealing assembly 52 may be noted in Fig. 2. The assembly 52 includes an annular sealing washer 53 of slightly greater inside diameter than the diameter of shaft 36 and slightly smaller outside diameter than the inside diameter of the thrust bearing 50. Thus the thrust bearing 50 and seal ring are dimensioned so that the thrust bearing 50 acts as an aligning member for the ring 53 and the associated assembly. In this manner the ring 53 can never shift sufficiently during eccentric movement thereof to ride on shaft 36 and thereby be placed under excessive rotational strains.

The seal ring 53, or washer, may be fabricated from numerous materials. It has been found that effective and complete sealing is accomplished when using a thermo-setting resin of the phenol formaldehyde derivative type, commonly known as "Bakelite" or "Durez," which has dispersed therein a substantial quantity of a metallic ingredient in a finely divided state. It has been found that a metallic ingredient such as bronze powder, which preferably is included in proportions of approximately 45% by weight of the total weight of the seal ring is most desirable. This proportion has been found suitable for use in seal rings that are employed in automotive pumps, however, proportions of bronze powder ranging from 25 to 60 per cent of the total weight of the seal ring are comprehended by this invention and may be satisfactorily utilized in many applications of the present invention. Other metallic powders such as tin powder, lead powder, lead coated copper powder, and iron powder, for example, may be employed in place of the bronze powder, such alternatives depending upon the metal of the bearing surface to be sealed and upon which the ring 52 rides. Similarly in place of the Bakelite base, other phenolic compositions may be used, also synthetic rubbers, polymerized isoprene or polymerized chloroprene, which is sold under the trade name "Duprene" etc., have been found to be satisfactory. In fact any plastic composition that can be molded may be employed wherein the fluids to be sealed do not have a deleterious effect thereon. Likewise fibrous materials can be employed when suitably bonded into a coherent self-sustaining shape.

A second seal member 54, disposed around the shaft 36 is also used in the seal assembly and is preferably formed of "Duprene" or some other resilient material that is substantially impervious to the fluid to be sealed. In this connection rubber, synthetic rubber, polymerized isoprene or extensible metal bellows may be used. In some cases cloth impregnated with the above mentioned rubber-like compositions is highly desirable. It is therefore to be understood that when the term "hardened plastic" is used in the appended claims that we refer to resins of the Bakelite type, synthetic rubbers above referred to and related compounds. The seal member 54 has an irregular configuration which may be noted in the drawing and includes two flange portions 56 and 58 at either end thereof. The flange 56 is disposed to contact the seal ring 53 while the flange 54 seats against the base of bore 51. The member 54 being made of resilient material and of somewhat greater longitudinal dimension than the space allotted for it within the bore 51, has an inherent tendency to force the seal ring 53 outwardly axially of the shaft 36, into sealing engagement with the sealing surface 48 of the impeller 46. In order to increase the sealing force between the sealing elements, a spring 60 is provided which is disposed about the shaft 36 and substantially within the member 54. A metal washer 62 is provided as a support for one end of the spring and is so formed as to seat on the inner surface of the flange 58. A second washer 64 is provided and includes an upwardly turned flange 65 for aligning the other end of the spring 60 and seats against the inner surface of the flange 56. Washers 62 and 64 prevents any possibility of cutting the resilient sealing member 54 by the spring 60.

Referring to Fig. 4, it will be noted that the washer 64 has three upwardly extending lugs or keys 66, evenly spaced around the inner periphery thereof and bent in the opposite direction to flange 65. These keys 66 are disposed to be loosely inserted within three evenly spaced surface recesses 68 formed in the seal ring 53 around the inner periphery thereof. In this manner, when the seal assembly is complete, the ring 53 is loosely keyed to the sealing member 54 to prevent any substantial relative rotational movement between ring 53 and member 54. It is apparent that the sealing member 54 being made of resilient material, such as "Duprene," has a relatively high co-efficient of friction and therefore has substantially no tendency to rotate within the bore 51, when the shaft 36 is rotating. Similarly the ring 53, due to the inclusion of metallic particles therein, has a relatively low co-efficient of friction and therefore slides easily against the polished surface 48 of the impeller 46 when the same is rotating. The friction seal between flange 56 of seal member 54 and the seal ring 53 is usually sufficient to prevent relative rotation between the two members, however, the keyed washer 64 obviates any possibility of relative rotational movement. The construction as hereinbefore described provides a sealing arrangement which is stationary when the shaft and impeller are rotating, thus eliminating much wear on the various parts of the seal.

The use of a seal ring, such as ring 53, made of a plastic material having a distribution of metallic particles therethrough aids in the efficiency of the present seal. Such a ring is considerably lighter in weight than a ring of the corresponding dimensions in metal. A light weight seal ring of this type has a low effective moment of inertia and therefore, readily follows eccentric motion of the shaft and impeller. Thus if the sealing surface of the impeller rotates in an eccentric manner, due to slight wear of the bushings 24 and 26, the seal ring 53 due to its low inertia readily follows the weaving motion of the shaft without interruption between the sealing surfaces. Likewise, the sealing member 54, being highly resilient, follows the eccentric movements of the ring 53 to maintain the seal therebetween. The sealing member 54 also can readily move outwardly, axially of the shaft 36, a substantial distance due to its inherent resilient qualities and the cooperating action of spring 60 and thereby maintain the seal, when end-play is present.

Fig. 5 shows a modification of the sealing arrangement as shown in Fig. 2. This embodiment utilizes a sealing member 75 of slightly different design to the member 54 used in the embodiment shown in Fig. 2. The member 75 is substantially a diaphragm and includes two flange portions 77 and 79 at either end thereof. Flange 77 contacts the seal ring 53 while flange 79 is keyed into a recess 81 in the housing 20. A thrust washer 83 substantially similar to washer 60 is pressed in place over the flange 79 to compress the same in the recess 81 and thereby seal the member 75 to the housing. An annular washer 85 is provided and seats on the inner surface of flange 77. The washer 85 has an outwardly turned flange 87 which positions a loop portion 89 of member 75 and likewise holds the spring 60 aligned with the shaft 36. A plurality of keys 91 (one of which is shown) formed on washers 85 engage the sealing washer 53 in a manner similar to that described in connection with Fig. 2.

The loop portion 89 provides sufficient resiliency so that the sealing member 75 can readily follow the seal ring 53 axially of the shaft to take up end-play.

Fig. 6 shows another modification of the seal arrangement wherein the washer 62 has been eliminated and the spring 60 has been forced within the bore of sealing member 154 thereby spreading the member 154 at the end thereof and providing a seal with the casing. Member 154 is similar in design to the member 54 but includes a somewhat thicker flange portion 158 at the one end thereof which is preferably a snug fit within bore 51.

In any of the aforementioned embodiments the keyed washer such as 64, or 85 can be eliminated and the seal ring 53 can be cemented to the sealing member. Likewise, if the rotational speed of the impeller is not excessive the friction between the two aforementioned elements is sufficient to prevent relative rotation, in which case the cement can be eliminated. In this modification the spring 60 rests directly on the inner surface of the sealing member flange or if desired a metal washer without keys (not shown) can be used as a seat for the spring.

It will be apparent that in all of the embodiments described that the surface 48 of the impeller not only acts as a surface which bears upon the thrust bearing 50 but also acts as a sealing surface against the seal ring 53. Similarly it is manifest that the sealing surface 48 can be formed as an integral part of the shaft 36. In fact, surface 48 can be associated with the shaft 36 and impeller 46 in any suitable manner providing it rotates with the shaft and is hermetically sealed thereto to provide a water-tight junction.

It is to be understood that the foregoing description being directed to a water pump design in no way limits the application of the present invention and that the present seal assembly can be used to advantage in any other seal application, for example, in washing machines, compressors and other mechanisms when a fluid seal is required.

While the embodiments of the present invention as herein disclosed, constitute preferred forms, it is to be understood that other forms might be adopted, all coming within the scope of the claims which follow.

What is claimed is as follows:

1. A fluid seal in combination with a rotatable shaft and housing therearound which includes an annular cavity about the shaft, of an extensible resilient sealing member comprising a sleeve of annular formation adapted to close the shaft and having spaced resilient integral flanges thereon, one of said flanges being adapted to peripherally engage the housing within the cavity at one end thereof, a sealing washer disposed about the shaft and between a portion of the shaft and the end of the other of said flanges, a coil spring disposed about the shaft and within the sealing member for bearing against said second-mentioned flange and against a portion of the housing for extending the member axially of the shaft whereby the member is in sealing engagement with the washer and the washer is sealingly engaged to the shaft, said spring being of sufficient diameter to spread said first-mentioned flange radially outwardly as the spring passes through the flange and abuts the housing whereby the first-mentioned flange is peripherally sealingly engaged with the housing.

2. A fluid seal, in combination with a rotatable shaft and housing therearound, comprising in combination; an annular, axially expansible, resilient sealing member adapted to enclose the shaft and having spaced integral resilient flanges thereon, one of said flanges being adapted to engage a portion of the housing and the other of said flanges being adapted to face a portion of said rotatable shaft, a spring disposed about the shaft and within the sealing member for bearing on said second mentioned flange and against a portion of the housing for axially extending the member of the shaft, said spring being of a slightly greater diameter than the inner diameter of said first-mentioned flange so that the spring expands the first-mentioned flange radially outwardly into sealing engagement with a portion of said housing.

3. A long life inherently squeakless sealing element for high-speed rotary pumps and the like wherein sealing is characterized by low pressure sliding contact tending to induce squeaking vibrations of the sealing element, said sealing element comprising a flat-surfaced member formed of molded hardened plastic and a metal of greater specific gravity than said plastic, the metal component constituting approximately two-fifths of the mass of said element and being in the form of fine particles uniformly dispersed throughout the plastic as a matrix.

4. In a fluid seal for high speed rotary pumps and the like of the type comprising relatively moving parts and a sealing element interposed between said parts and urged to low pressure sliding contact with one part such as normally tends to set up squeaking vibrations in the seal, the sealing element of the combination claimed being formed of molded hardened plastic and bronze in inherently squeakless composition, the bronze component constituting approximately two-fifths of the entire mass of said element and being in the form of fine particles uniformly dispersed throughout the plastic as a matrix.

JEAN A. LIGNIAN.
ROLAND P. KOEHRING.